Figure 1:
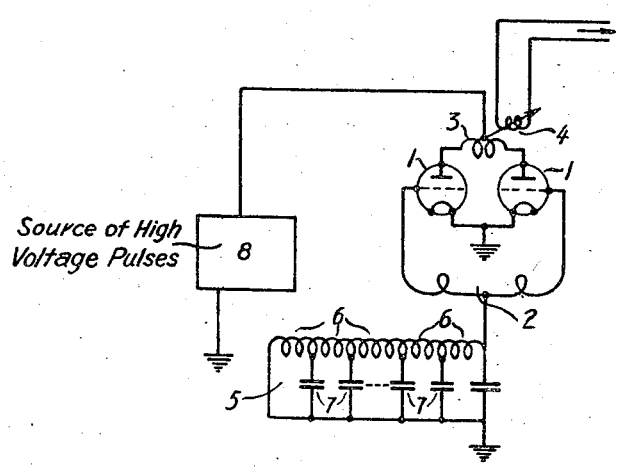

Aug. 13, 1946.  A. D. BLUMLEIN ET AL  2,405,552
PULSE GENERATING THERMIONIC VALVE APPARATUS
Filed June 13, 1942  2 Sheets-Sheet 2

INVENTORS
Alan Dower Blumlein
Eric Lawrence Casling White
BY Loyd Hall Sutton
ATTORNEY Patented Aug. 13, 1946

2,405,552

UNITED STATES PATENT OFFICE 2,405,552

PULSE GENERATING THERMIONIC VALVE APPARATUS

Alan Dower Blumlein, Ealing, London W. 5, and Eric Lawrence Casling White, Hillingdon, England, assignors to Electric & Musical Industries Limited, Hayes, England, a corporation of Great Britain Application June 13, 1942, Serial No. 446,973
In Great Britain June 17, 1940

4 Claims. (Cl. 250—36)

This invention relates to pulse generating oscillator circuits.

In the determination of the distance of reflecting objects by measurement of the time delay between the emission of a short burst of oscillations from a transmitter and the reception of the oscillations reflected from an object, it is necessary when the object is close to the transmitter for the transmitted oscillations to decay very rapidly after reaching their peak amplitude so that when the reflected oscillation is picked up on the receiving aerial its amplitude is substantially greater than the remnant of the transmitted oscillations picked up directly by the receiving apparatus. It is found that the output from the pulse generating oscillator of the transmitter does not always decrease to zero sufficiently rapidly because the natural damping of its radio frequency circuits is not always sufficiently great.

It is therefore the object of the present invention to provide an improved arrangement for increasing the damping of the radio frequency circuits of pulse generating oscillators a predetermined time after the application of the exciting voltage so as to cause the oscillatory output to decay more rapidly.

According to the present invention, there is provided a pulse generating oscillator circuit comprising an oscillatory circuit and one or more thermionic valves associated therewith so as to set up oscillations therein if suitable exciting pulses are applied to one or more electrodes thereof and means for causing a control electrode of said valve or valves to become positive in relation to the cathode associated therewith at a predetermined time after the application of each of said exciting pulses, the arrangement being such that the consequent reduction in the impedance between the control electrode and cathode of said valve or each of said valves increases the damping of said oscillatory circuit, whereby the oscillations therein are caused to decay more rapidly after the termination of each of said exciting pulses.

Preferably, said means comprises a misterminated and preferably short circuited time delay network included in the circuit between the control electrode and cathode of said valve or each of said valves, said network being so arranged in said circuit that in operation energy is fed into said network during the generation of said oscillations and said energy is reflected by said mistermination and serves after a predetermined time to cause the control electrode of said valve or each of said valves to become positive with respect to the cathode associated therewith. Said means may alternatively comprise an inductance included between the control electrode and cathode of said valve or each of said valves, said inductances being so arranged in said circuit that energy is fed into said inductance during the generation of said oscillations and said energy serves after the termination of said exciting pulse to cause the control electrode of said valve or each of said valves to become positive with respect to the cathode associated therewith. If desired, said means may include a circuit comprising a voltage step down device such as an autotransformer or a potentiometer and delaying means so arranged that if said exciting pulses are applied thereto, pulses similar thereto but of lower amplitude and delayed with respect thereto are applied between the grid and cathode of said valve or each of said valves.

In order that the said invention may be more clearly understood and readily carried into effect, it will now be described with reference to the accompanying drawings, in which—

Figure 2:
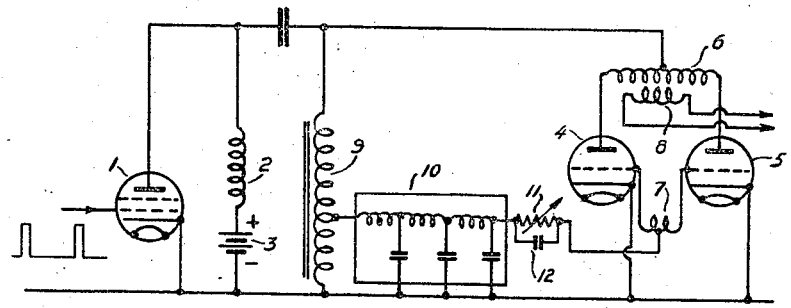
Figure 3:
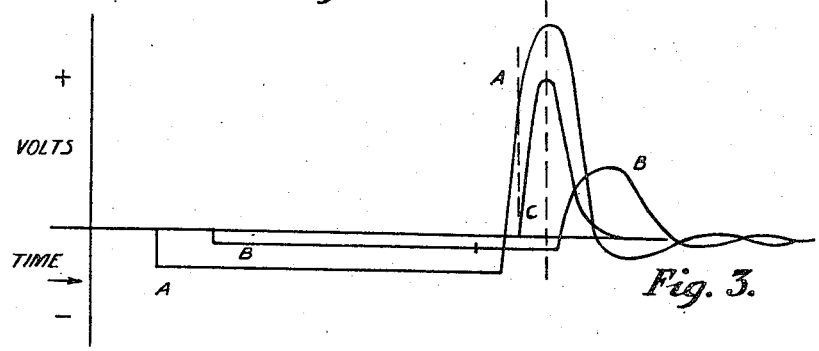
Figure 4:
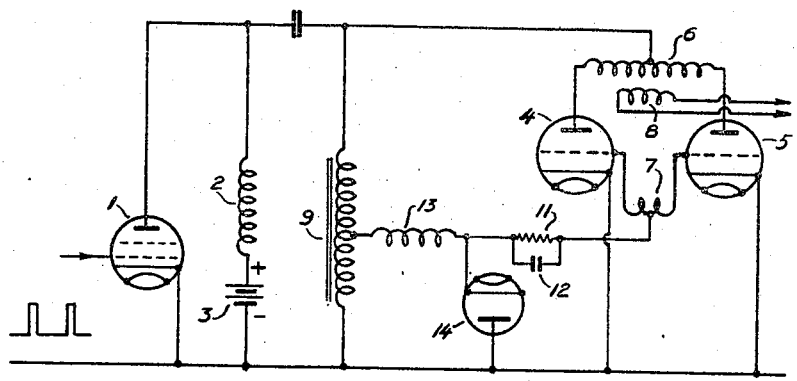
Figure 5:
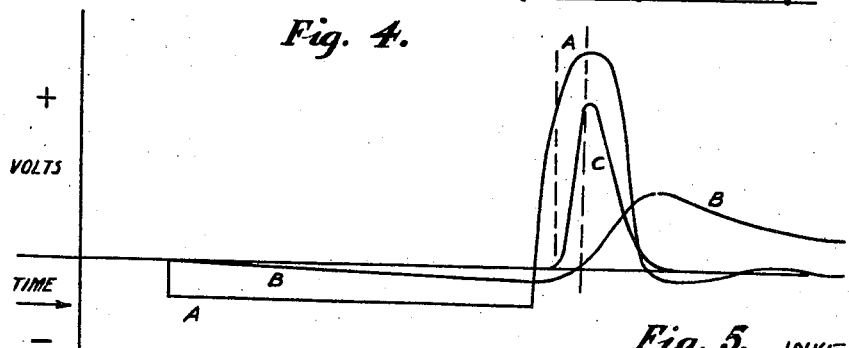

Figure 1 shows an oscillator circuit constructed according to one embodiment of the invention, Figure 2 shows an oscillator circuit constructed according to another embodiment of the invention, Figure 3 illustrates curves explanatory of the operation of the oscillator of Figure 2, Figure 4 illustrates a further embodiment of the invention, and Figure 5 illustrates curves explanatory of the operation of the oscillator shown in Figure 4.

Referring first to Figure 1 of the drawings, the arrangement will be seen to include a push-pull oscillator comprising the triode valves 1 the tuned grid circuit 2 and the tuned anode circuit 3 which is coupled by means of a coupling coil 4 to an aerial (not shown). The centre tap on the inductance of the tuned grid circuit 2 is returned to the cathodes of the valves 1, which are earthed, via the time delay network 5 consisting of series inductance elements 6 and shunt capacity elements 7. Said inductance elements 6 may, as is well known, be coupled to improve the uniformity of delay with frequency. Said network 6 is preferably short circuited at its end remote from said tapping point, but may be misterminated in any manner so as to cause reflection in the desired manner. The centre tap of the inductance of the tuned anode circuit 3 is connected to a source of intermittent high voltage shown diagrammatically at 8. Let it be assumed that said source of high voltage provides exciting pulses of 2 microseconds duration at relatively long time intervals which may be, for example, 1500 microseconds, and that the time delay of said network 5 is 1 microsecond.

The arrangement then operates as follows. When the exciting voltage pulse is applied to the anodes of the valves 1, oscillations are generated in the circuits 2 and 3, and due to the positive excursions of the grids of the valves grid current flows between the grid and cathode of each of the valves 1 and thence through the network 5 to the centre tap of the tuned grid circuit 2. The network 5 is equivalent to a grid leak having a resistance equal to the characteristic impedance of said network 5, and hence the flow of grid current sets up a negative voltage across said network 5, the voltage being equal to the product of the mean grid current and said characteristic impedance. This negative voltage propagates along said network 5 to its left hand end, where it is reflected as a positive voltage by the short circuit termination and the reflected positive voltage reaches the right hand end two microseconds after the application of the negative voltage by the grid current due to the commencement of the oscillations. At this time, however, the exciting voltage pulse in the anodes of the valves 1 terminates, so that the excitation is removed. Each of the valves 1 is thus in a condition to provide a very low grid/cathode impedance in response to a positive bias applied between said grid and said cathode, since anode control of the cathode emission has been removed, so that when the reflected positive voltage reaches the right hand end of said network 5, the grid/cathode impedances of each of the valves 1 will fall to a low value and the tuned circuit 2 will be heavily damped since it is shunted by said impedances in series with each other.

The impedance assumed by grid cathode paths due to the positive voltage provided by said network 5 will not in general be equal to the characteristic impedance of said network 5, but will in general be lower than said impedance, so that further reflection will take place at the right hand end of said network, the re-reflected voltage being negative and giving rise two microseconds later to a further positive voltage at the right hand end of said network. The voltage at the right hand end will thus decrease in steps every two microseconds until the energy in the network is dissipated, so that a positive voltage is maintained on the grids of the valves 1 for a period which is a multiple of 2 microseconds, the period being largest for the lowest grid impedance. This has the advantage that the damping on the circuit 2 persists long enough to prevent any tendency to oscillation should the cut-off of the anode voltage be incomplete as, for example, if a subsidiary pulse of anode voltage were to be applied after the termination of the first pulse.

In practice, the oscillator may not commence to oscillate until a short time after the application of the exciting pulse to the anode 5 of the valves 1, so that the time delay of the network 5 may be made a little shorter than 1 microsecond. The optimum time delay of the network 5 can readily be determined experimentally by observing the envelope waveform of the generated oscillations upon a cathode ray oscillograph.

The characteristic impedance of the network 5 may conveniently be chosen to be approximately equal to the value of the grid leak which would normally be used with the valves 1, and may be, for example, 1500 ohms in the case of an oscillator absorbing 3 amperes at 6000 volts for its anode input. It will be appreciated that the extreme right hand capacity element of the network 5 may be constituted either wholly or in part by existing capacity between the centre tap on the inductance of the tuned circuit 2 and earth.

It will be appreciated that, if desired, separate and similar time delay networks may be included in the individual grid/cathode circuits of the valves 1.

In an alternative form of the invention, the time delay network 6 is replaced by an inductance. The midpoint of the grid circuit inductance 2 is according to this alternative arrangement connected to earth through an inductance in series with a grid leak shunted by a grid condenser. When the valves 1 oscillate as a result of the application of the exciting pulse to their anodes, grid current flows through said inductance and current builds up therein. When the high voltage pulse terminates, the current flowing in the inductance persists and holds the grids of valves 1 positive and applies damping to the tuned circuit 2 in the manner previously described. This damping may be maintained for the time necessary to reduce the amplitude of the oscillations in the circuit 2 to the desired low value by suitable choice of the value of said inductance.

It will be understood that even though it is the flow of grid current which causes the desired damping to be applied in the arrangement described above, it is not necessary that the valves 1 shall self-oscillate. Thus, for example, the valves 1 may be arranged as a power amplifier, radio frequency oscillations from a separate source being fed to the circuit 2 simultaneously with the application of the high voltage pulse to the anodes of the valves 1. In this case, grid current will flow as in the arrangement previously described and the current reflected by the network 5 or the current flowing in the cathode circuit inductance will serve to apply damping so as to quench the residual oscillations in the circuit 2 after the excitation oscillatory voltage and the anode voltage have ceased.

In the arrangement above referred to, the desired damping is provided as a result of the flow of grid current arising from oscillation of the radio frequency circuits of the apparatus. It will be appreciated, however, that the damping may be provided by applying positive pulses from an external source of pulses and some examples of arrangements of this kind will now be described with reference to the Figures 2 to 5 of the drawings.

Referring to Figure 2, the valve 1 and the inductance 2 in series with a battery 3 represent a high voltage pulse generating circuit. Short positive pulses are applied to the valve 1 so as to render the valve conducting enabling current to build up in the inductance 2 from battery 3, and when the valve 1 is rendered non-conducting at the end of the applied pulse, the energy in the inductance 2 is discharged into the valve and associated stray capacities generating a pulse having a voltage which is very much higher than the voltage of the battery 3. The high voltage pulses generated by the inductance 2 are applied to excite an oscillator circuit comprising a pair of valves 4 and 5, the anodes and grids of which are coupled together by coupling coils 6 and 7, the centre point of coil 6 being connected to the upper end of the inductance 2, as shown. On the application of the high voltage from the coil 2 to the anodes of the valves 4 and 5 these valves generate short bursts of radio frequency oscillations controlled by the duration of the applied pulses, the radio frequency oscillations being fed to an external lead, such as an aerial, by a coupling coil 8. In order to prevent the inductance 2 oscillating after the initial voltage surge the circuit comprising valves 4 and 5 is arranged to afford approximately critical damping and consequently the energy stored in the inductance 2 is substantially completely transformed into radio frequency energy in the oscillator comprising valves 4 and 5 in the first half cycle. The radio-frequency oscillatory circuit connected to valves 4 and 5 would, however, for the reasons stated above continue to oscillate with an inconveniently low damping even when the applied voltage from the inductance 2 falls to zero and in the embodiment shown in Figure 2 the damping is increased by feeding a fraction of the high voltage exciting pulse applied to the valves 4 and 5 to the grids of these two valves. As shown, this voltage is derived from an auto-transformer 9 shunted across the inductance 2 and the tapping point of the transformer is connected to the centre point of the coupling coil 7 through the delay network 10.

Referring now to Figure 3, the curve A indicates the wave form of the exciting voltage applied to the anodes of the valves 4 and 5 and the curve B represents the wave form of the voltage applied to the grids of the valves 4 and 5 after passing through the delay network 10. It will be seen from Figure 3 that the delay imposed by the network 10 is made greater than half the duration of the exciting voltage pulse applied to the valves 4 and 5 but less than the maximum width of the pulse so that the voltage applied to the anodes of valves 4 and 5, and hence the radio-frequency output, reach their maximum values before the voltage applied to the grids of valves 4 and 5, as shown by the curve B, causes the grids to swing positive to damp the circuit, it being observed that the voltage applied to the grids of valves 4 and 5 reaches a substantial positive value before the voltage applied to the anode of valves 4 and 5 diminishes to zero. It will also be observed that before the application of the positive pulses A and B to the valves 4 and 5 there exists a long negative pulse during the charging period of the inductance 2 with the result that the grids of valves 4 and 5 are also maintained negative and remain negative when the voltage applied to the anodes of the valves 4 and 5 commences to increase. The effect of this is to prevent the valves 4 and 5 commencing to pass current until the voltage on their anodes has risen substantially to the maximum amplitude and steepens the leading edge of the envelope of the generated oscillations as shown by the curve C in Figure 3. The exact point at which the valves 4 and 5 start to oscillate may be adjusted if desired by varying the magnitude of the grid leak 11 which, as shown, is shunted by condenser 12. The leak 11 can also be arranged to introduce extra negative bias, the magnitude of which of course depends upon the adjusted value of the leak. This bias serves also to ensure that the second and succeeding positive voltage swings on the anodes of valves 4 and 5, which are of course considerably smaller in amplitude than the main voltage pulse A, do not cause further small bursts of radio-frequency energy.

The delay network 10 may have any desired number of sections and may be terminated by a shunt capacity if several sections are used or by a capacity shunted by a resistance if only a single section is used so as to give uniform delay over the range of frequencies comprised in the applied pulses.

The first series inductance of the delay network 10 may be provided by the leakage inductance of the auto-transformer 9, in which case said auto-transformer is conveniently air-cored.

Alternatively, the delay network 10 may be omitted, and the auto-transformer replaced by two uncoupled inductances connected in series, the grid leak 11 and condenser 12 being returned to the common connection of said inductances. In this case, the desired delay is provided by a capacity, which may be the capacity to earth of the grid circuits of valve 1 in shunt with the lowermost of said inductances, the delay obtained being determined by the time required to charge said capacity.

Figure 4 of the drawings illustrates a modification of the circuit shown in Figure 2, in which the delay network 10 is replaced by an inductance 13 in series with a diode valve 14, the anode of which is earthed, as shown. During the period that current is allowed to build up in the inductance 2 current is also built up in the inductance 13 through the diode 14 thereby affording an increasing negative potential for application to the control grids of valves 4 and 5, as shown in the curve B in Figure 5. When the valve 1 is rendered non-conducting the potential across the inductance 2 rises to generate the pulse voltage for application to the valves 4 and 5 and the currents in the inductance 2 and inductance 13 diminish, reaching zero when the generated voltage is a maximum.

It will be seen from Figure 5 that when the voltage pulse A reaches its maximum the bias applied to the grids of valves 4 and 5 has decreased to zero so that at a point intermediate the initiation of the voltage pulse A and the point at which the bias has decreased to zero the valves 4 and 5 burst into oscillation. This intermediate point may be controlled if desired by the use of the grid leak 11 and condenser 12 arranged to generate a fixed additional bias as with the arrangement shown in Figure 2. When the voltage at the tapping point on the auto-transformer rises above the potential of the anode of the diode 14 the latter becomes non-conducting and the current in the inductance 13 charges the stray capacities associated with the grid circuits of valves 4 and 5 eventually driving these grids positive in the manner shown by the curve B in Figure 5, producing results similar to those described in connection with Figure 2.

The inductance 13, may, if desired, be constituted by the leakage inductance of the transformer 9, in which case said auto-transformer is conveniently air-cored.

It is advantageous with any of the examples described to insert a resistance shunted by a condenser in series with the lead supplying the excitation voltages to the anodes of the valves of the pulse generation oscillator so as to produce a small negative bias which will effectively prevent the valves from coming into action on subsidiary voltage pulses which may be provided by the source of excitation voltage.

It will be appreciated that the pulses applied to the grids of valves 4 and 5 need not be derived from the valve 1 but may be provided by another source of lower voltage and power output which is suitably synchronised therewith. It will also be appreciated that, as in the case of the arrangement described with reference to Figure 1 of the drawings, the valves 4 and 5 need not be arranged to be self-oscillatory, but may be driven by a source of radio frequency oscillations.

What we claim is:

1. Apparatus for generating pulses of oscillations of a predetermined frequency comprising an oscillatory circuit tuned to said predetermined frequency and at least one thermionic valve having electrodes including a cathode, anode and a control electrode, means for applying exciting pulses to said valve so as to cause said valve to set up oscillations at said frequency in said oscillatory circuit and means for biassing said control electrode to a positive potential in relation to said cathode at a predetermined time after the application of each of said exciting pulses so as to reduce the impedance between said control electrode and cathode and thereby to increase the damping of said oscillatory circuit to cause the oscillations therein to decay more rapidly after the termination of each of said exciting pulses.

2. Apparatus for generating pulses of oscillations according to claim 1, in which said means for biassing said control electrode comprises means for developing from said exciting pulses, pulses of lower amplitude delayed in time with respect thereto and means for applying said last-mentioned pulses to said control electrode.

3. Apparatus for generating pulses according to claim 1, wherein said means for biassing said control electrode positive with respect to said cathode comprises a time delay network and means for feeding energy from the cathode and control electrode circuit of said valve to said network during the generation of oscillations and means for misterminating one end of said network so that energy is reflected therefrom into said cathode and control electrode circuit.

4. Apparatus for generating pulses of oscillations according to claim 1, in which said means for biassing said control electrode comprises an inductance, means for feeding current to said inductance during the generation of said oscillations and for causing said current after the termination of each of said exciting pulses to bias said control electrode.

ALAN DOWER BLUMLEIN.
ERIC LAWRENCE CASLING WHITE.